United States Patent [19]

Kopczynski

[11] 4,403,901
[45] Sep. 13, 1983

[54] DUMP BIN

[76] Inventor: John F. Kopczynski, 1671 Sweeney St., North Tonawanda, N.Y. 14120

[21] Appl. No.: 194,612

[22] Filed: Oct. 6, 1980

[51] Int. Cl.³ .................. B65G 65/23; B66F 9/19
[52] U.S. Cl. ................................... 414/422; 414/424; 414/608
[58] Field of Search ............... 414/422, 424, 420, 404, 414/425, 354, 639, 642, 643, 645, 646, 647, 648, 649, 650, 651, 652, 653, 654, 655, 656, 598, 609, 610, 608

[56] References Cited

U.S. PATENT DOCUMENTS

| | | |
|---|---|---|
| 100,259 | 3/1870 | Chichester ................. 414/424 X |
| 766,817 | 8/1904 | Flannery .................. 414/643 X |
| 2,482,692 | 9/1949 | Quales et al. ............. 414/647 X |
| 2,582,759 | 1/1952 | Sass ...................... 414/422 X |
| 2,601,163 | 6/1952 | Miller .................... 414/422 X |
| 3,206,051 | 9/1965 | Troller . |
| 3,207,346 | 9/1965 | Beutler et al. . |
| 3,270,900 | 9/1966 | Sherman ................... 414/422 X |
| 3,656,643 | 4/1972 | Keneson et al. ........... 414/422 |
| 3,658,199 | 4/1972 | Owen . |
| 3,679,077 | 7/1972 | Gennick . |
| 3,881,617 | 5/1975 | Miller et al. . |
| 3,891,106 | 6/1975 | Alcanzare . |
| 4,286,913 | 9/1981 | Rowe et al. ............... 414/422 |
| 4,334,820 | 6/1982 | Homura ................... 414/422 X |

FOREIGN PATENT DOCUMENTS

650937  3/1979  U.S.S.R. .......................... 414/652

Primary Examiner—Bruce H. Stoner, Jr.
Attorney, Agent, or Firm—Joseph P. Gastel

[57] ABSTRACT

A dump bin having a housing including a floor and a plurality of upstanding sides, a sleeve vertically mounted on one of the sides, a slidable rod in the sleeve, a pair of aligned shafts extending outwardly from opposite sides for receiving bearings mounted on the forks of a fork lift, the slidable rod being movable by gravity from a retracted position to an extended position below the dump bin after it has been lifted by a fork lift, with the lower portion of the rod causing the dump bin to pivot about the axis of the shafts as the fork lift is moved toward the container after the slidable rod has been moved into abutting relationship with the container. The dump bin is so balanced so that after it is moved away from the container and the slidable rod loses contact with the container, the dump bin will pivot to the attitude which it normally occupies when it is being loaded, and when the dump bin is moved downwardly to rest on the ground, the slidable rod will automatically retract into the sleeve in which it is mounted.

17 Claims, 23 Drawing Figures

DUMP BIN

BACKGROUND OF THE INVENTION

The present invention relates to a dump bin of the type which receives waste material and is thereafter transported to and dumped into a larger container.

By way of background, dump bins of the type with which the present invention is concerned are shown in U.S. Pat. Nos. 3,656,643, 3,881,617 and 3,207,346. In each of the prior types of dump bins, there was no simple and expedient way of tilting the dump bin to effect dumping after it had been transported by means of a fork lift or the like to the dumping site. In this respect, special latching attachments were required, as in U.S. Pat. No. 3,881,617, or a series of compound movements had to be effected, as in U.S. Pat. No. 3,656,643, or a relatively complex arrangement had to be used to effect dumping as in U.S. Pat. No. 3,207,346. It is with overcoming the deficiencies of the prior art that the present invention is concerned.

SUMMARY OF THE INVENTION

It is accordingly one object of the present invention to provide an improved dump bin which is extremely simple in construction and which can be dumped into a larger container by merely moving the dump bin on a fork lift or other device relative to the container thereby causing the dump bin to automatically tip to a dumping position to effect dumping, and which thereafter returns to its normal attitude after the dump bin has been moved away from the container.

Another object of the present invention is to provide an improved dump bin which can be dumped different distances into a dumping area by selecting different dumping actuating members.

A further object of the present invention is to provide an improved dump bin which is combined with a pallet lifted by a fork lift and which can be dumped by merely effecting relative movement between the dump bin and a body into which the dump bin is to be dumped.

A still further object of the present invention is to provide an immproved dump bin mounted on wheels for manual movement to any desired area and which can be lifted by a lift truck or any other suitable device and which can be dumped by merely effecting relative movement between the dump bin and the body into which it is to be dumped.

Yet another object of the present invention is to provide an improved wheel dump bin which can be placed in an attitude so that materials may be swept onto the floor thereof, and which can be picked up by any conventional means and dumped by merely moving the dump bin relative to the body into which dumpng is to be effected. Other objects and attendant advantages of the present invention will readily be perceived hereafter.

The present invention relates to a dump bin comprising a floor, a plurality of sides extending upwardly from said floor, said means on said bin for lifting said bin, and retractable-extensible means on said bin for maintaining a normally retracted position when said bin is at rest but assuming an extended position at a lower elevation after said bin has been lifted for dumping, whereby said retractable-extensible means in said extended position can cause said bin to tip as said bin continues to be moved after said retractable-extensible means has abutted said external member. The present invention will be more fully understood when the following portions of the specification are read in conjunction with the accompanying drawings wherein:

DESCRIPTION OF THE PREFERRED EMBODIMENTS

The improved dump bin 10 of the present invention is for use in factories, warehouses, or other commercial establishes. The dump bin is placed in a location where it receives waste material. Thereafter, by means of a fork lift, or a chain hoist in certain instances, the dump bin is conveyed to a large container where it is dumped and thereafter returned empty to any desired location for receiving additional waste material.

Figures 1, 2, 3, 4:
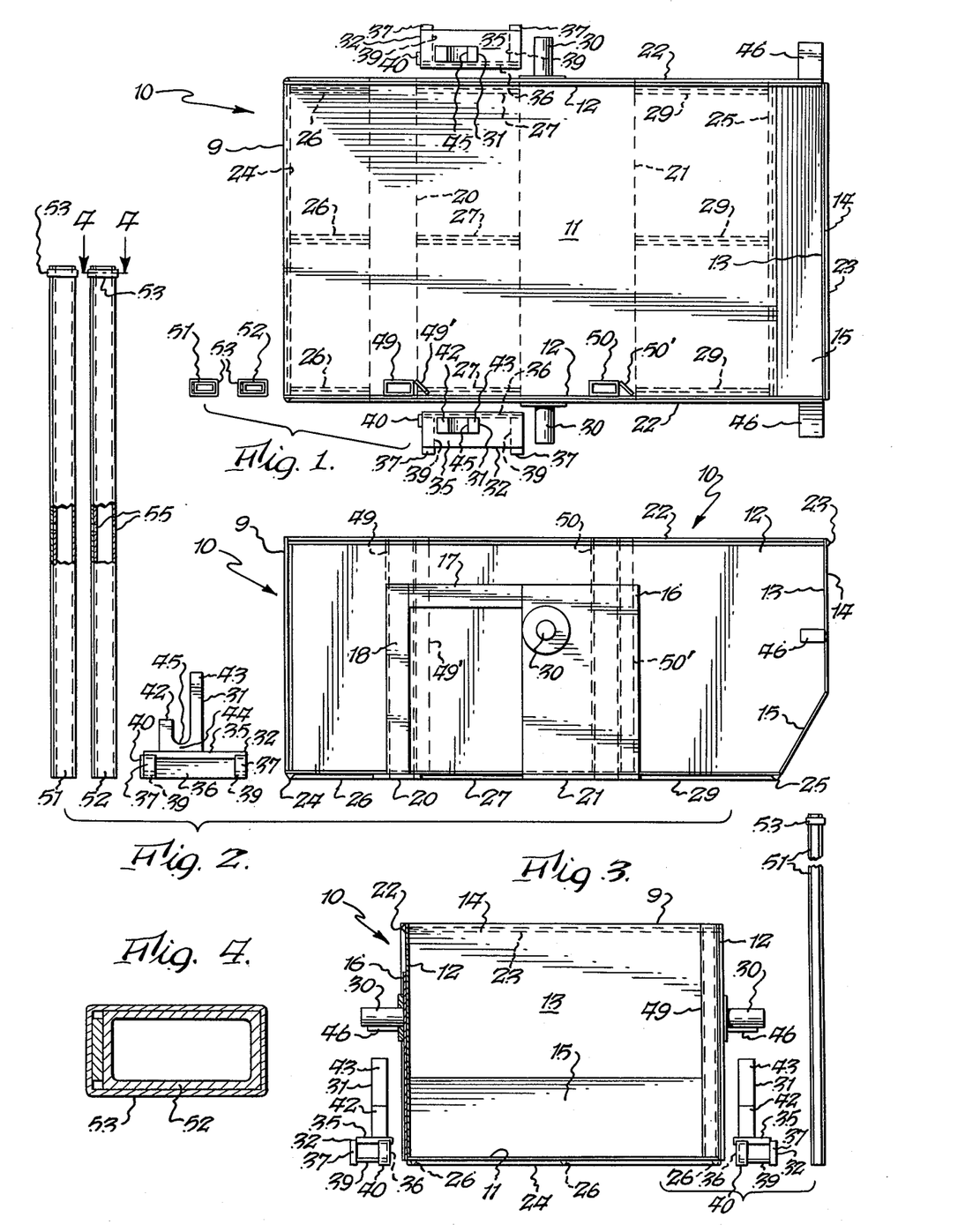
FIG. 1 is a plan view of the various components of the dump bin.
FIG. 2 is a side elevational view of the various components of the dump bin.
FIG. 3 is a front elevational view of the various components of the dump bin.
FIG. 4 is a cross sectional view taken substantially along line 4—4 of FIG. 2 and showing the construction of the tops of the sliding rods.

The dump bin 10 includes a housing 9 having a floor 11, a pair of side walls 12 extending upwardly from floor 11, and a rear wall 13 which includes a vertical portion 14 and a lower inclined portion 15. The side of dump bin 10, which is opposite rear wall 13, is open. A plurality of reinforcing plates 16, 17 and 18 are welded to each side wall 12, and a plurality of reinforcing plates 20 and 21 are welded to the underside of floor 11. A top rim of reinforcing angles are welded along the top edges of side walls 12 and a reinforcing angle 23 is welded along the top edge of rear wall 13. Reinforcing angles 24 and 25 are welded to the underside of floor 11. A first set of three angles 26 is welded to the underside of floor 11 between angle 24 and reinforcing plate 20. A second set of reinforcing angles 27 is welded to the underside of floor 11 between reinforcing plates 20 and 21. A third set of reinforcing angles 29 is welded to the underside of floor 11 between reinforcing plate 21 and angle 25. By the use of the above-described reinforcing plate and reinforcing angles, relatively thin sheet steel material may be used for side walls 12, rear wall 13 and floor 11.

Extending outwardly from opposite sides of walls 12 are a pair of coaxially aligned shafts 30 which are engaged by bearings 31 for lifting dump bin housing 9. Bearings 31 are mounted on shoes 32 which are adapted to be mounted on the ends of the forks 33 of a fork lift truck 34. Each shoe 32 includes an upper plate 35 to which the underside of bearing 31 is welded, a side plate 36 welded to the underside of top plate 35, a pair of vertical bars 37 extending downwardly from top plate 35 at opposite ends thereof and a pair of horizontal bars 39 welded between bars 37 and plate 36. As can readily be visualized from FIGS. 6 and 7, the forks 33 of a fork lift are received in shoes 32, and the amount which shoes 32 can move onto forks 33 is limited by bars 40 welded to the ends of shoes 32. A chain 41 (FIG. 6) prevents each shoe 32 from dropping off of the end of each fork 33 in view of the fact that it is attached between shoe 32 and an end of fork 33 which is movable therewith.

Each bearing 31 is essentially a U-shaped member having a smaller vertical leg 42 and a longer vertical leg 43. The two are connected by a base 44 which has a radius 45 at its upper side which is slightly larger than the radius of each shaft 30 so that each shaft 30 can rotate in bearing 31. It can readily be visualized that after the shoes 32 are mounted on forks 33 and the fork lift is brought to the position shown in FIG. 5, when the forks 33 are lifted, the dump bin housing 9 can be lifted by moving the forks upwardly and causing shaft 30 to be received in bearing 31. Stop lugs 46 are welded to the outer sides of walls 12, and the balance of housing 9 is such that when housing 9 is lifted, it will rotate in a clockwise direction in FIGS. 6 and 7 until lugs 46 rest on forks 33.

Figure 5:
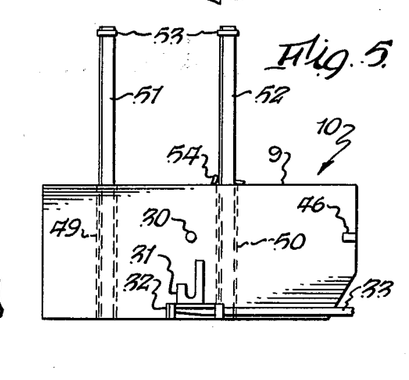
FIG. 5 is a reduced side elevational view of the dump bin of FIGS. 1-4 with the slide rods assembled on the bin housing and showing a shaft bearing mounted on a fork of a fork lift in position to move into engagement with the shaft extending outwardly from the bin housing.
Figure 6:
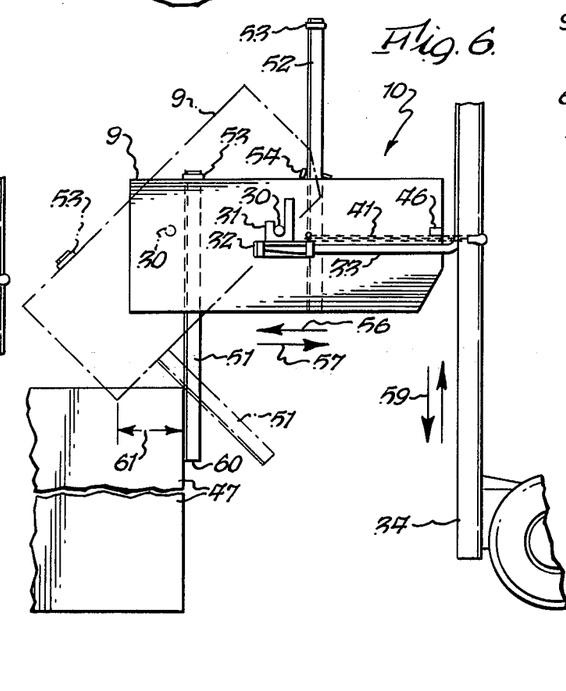
FIG. 6 is a reduced side elevational view showing in solid lines the dump bin lifted by a fork lift and in position to be dumped into a container, and showing in dotted lines the position which the dump bin assumes during dumping when the forward slidable rod is used to effect tipping.
Figure 7:
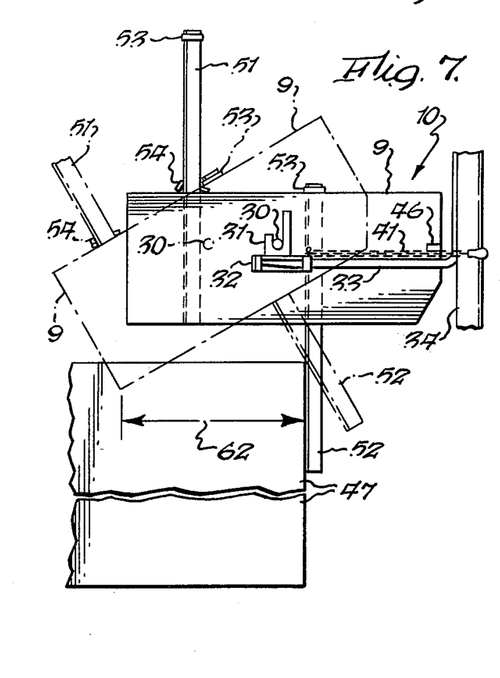
FIG. 7 is a view similar to FIG. 6 but showing the position of the dump bin when the rear slidable rod is used to effect tipping.

In accordance with the present invention, an improved arrangement is provided for causing housing 9 to tip from the solid line position in FIG. 6 to either of the solid line positions shown in FIGS. 6 and 7 solely as a result of moving the fork lift 34 toward the large stationary container 47 which may be located at a convenient central location to which a plurality of dump bin housings 9 may be brought for emptying. Mounted on the inside of one wall 12 are two spaced substantially parallel rectangular sleeves 49 and 50 which are open at opposite ends and receive hollow slidable rods 51 and 52, respectively. Sleeves 49 and 50 are reinforced by plates 49' and 50' welded in the shown position. A collar 53 (FIG. 4) is secured to each slidable rod. As can be seen from FIG. 5, when the housing 9 is resting on the ground, both slidable rods 51 and 52 can assume a position wherein their lower ends are flush with the ground. In FIG. 5, slidable rod 52 has a pin 54 extending through a pair of spaced aligned apertures 55 so that rod 52 cannot drop downwardly in sleeve 50 when housing 9 is lifted. However, slidable rod 51 is not restrained in this manner and therefore as housing 9 is lifted from the position of FIG. 5 to the position of FIG. 6, slidable rod 51 will move from the position of FIG. 5 to the position of FIG. 6 through a hole in floor 11 until collar 53 abuts the top of the sleeve. It can readily be seen that while housing 9 is being carried, that is, while it assumes the solid-line position of FIG. 6, it will remain horizontal. The fork lift will move in the direction of arrow 56 until it engages the side of open container 47. At this time the lower end of extended rod 51 will engage the side wall of container 47 and continued movement in the direction of arrow 56 will cause housing 9 to tip from the solid-line position to the dotted-line position wherein material will be dumped from housing 9 into container 47. After dumping has been completed, the fork lift is moved in the direction of arrow 57 and as rod 51 loses contact with the side of container 47, housing 9 will tilt back to the solid-line position shown in FIG. 6 because of the manner in which it is balanced. The empty housing 9 will eventually reach a position wherein lugs 46 rest on forks 33. The fork lift truck is then driven to the location at which housing 9 is to be deposited and the forks 33 are moved in the direction of arrow 59. At ths time housing 9 will be in a substantially horizontal position as shown in dotted-lines in FIG. 6, and as it is lowered, the lower end 60 of rod 51 will engage the ground and slide upwardly in sleeve 49 until it reaches the position shown in FIG. 5. Thus, by the use of a slidable rod, such as 51, the forward motion of the fork lift truck can be used to effect dumping, as described in detail above.

The reason an additional rod 52 is provided is so that dumping of housing 9 may be effected into different areas of container 47. In this respect, it can be seen from FIG. 6 that the tilted housing 9 is located a distance 61 from the side of the container when slidable rod 51 is being utilized. However, if it is desired to effect the dumping a distance 62 from the side of the container, as shown in FIG. 7, the pin 54 is used to lock slidable rod 51 in its uppermost position, so that it cannot slide downwardly, and to permit slidable rod 52 to slide downwardly in a manner described above relative to rod 51 so that dumping will be effected in the manner shown in FIG. 7.

Figure 8:
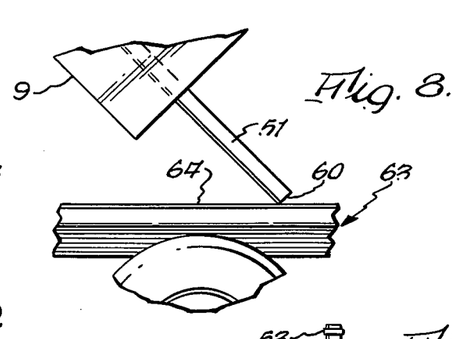
FIG. 8 is a fragmentary view showing the manner in which dumping may be effected on a flat surface, such as a flat bed trailer, when the forward slidable rod is used to effect tipping.
Figure 9:
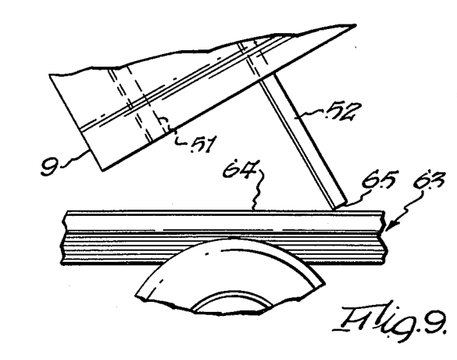
FIG. 9 is a view similar to FIG. 8 but showing the rear slidable rod used to effect tipping.

In FIGS. 8 and 9 the manner of dumping housing 9 onto a flat surface, such as the flat bed of a truck 63, is shown. In this respect, in FIG. 8 slidable rod 51 is shown in the extended position, and to effect dumping, the housing 9 is lowered until the lower end 60 of rod 51 engages the top surface 64 of the truck and thereafter the fork lift truck is moved forwardly so that housing 9 will be caused to tilt. In FIG. 9, slidable rod 52 is shown in the extended position, and to effect dumping onto the surface 64 of flat bed truck 63, the housing 9 is lowered until the lower end 65 of rod 52 engages the top of truck 63 and thereafter the fork lift is driven fowardly to cause housing 9 to tilt. In both instances, when the fork lift is backed up, the housing 9 will return to a horizontal position as described above.

Figure 10:
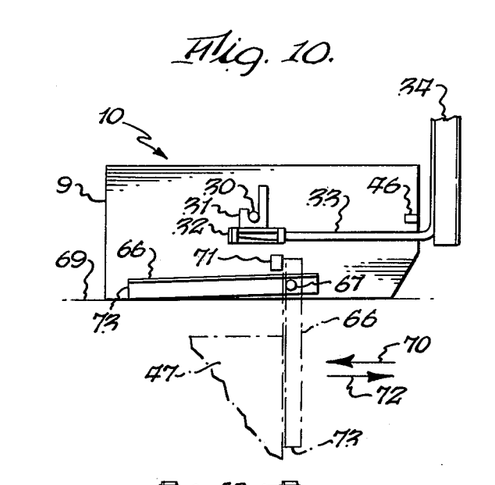
FIG. 10 is a fragmentary view of a modified dump bin having a pivotable rod for effecting tipping, rather than the slidable rods of FIGS. 1-9.
Figure 11:
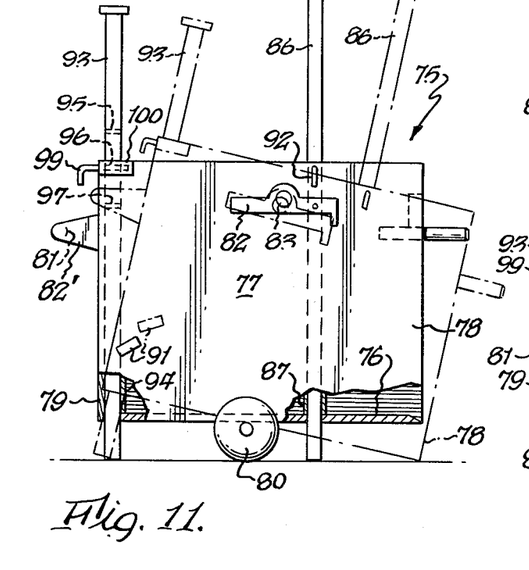
FIG. 11 is a further modified embodiment of the present invention showing a dump bin mounted on wheels.
Figure 12:
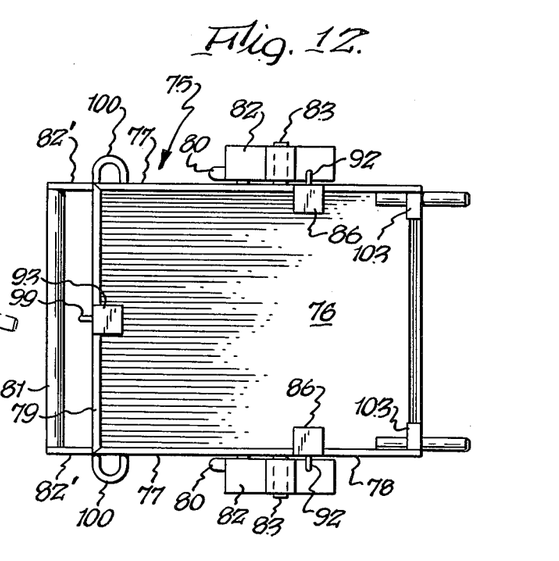
FIG. 12 is a plan view of the dump bin of FIG. 11.

In FIG. 10 a modified form of the present invention is shown wherein the slidable rods 51 and 52, and their associated sleeves, have been eliminated. Otherwise, housing 9 and bearing 31 may be identical to that shown in FIGS. 1-9. A pivotable rod 66, which pivots on shaft 67 mounted on the outside of housing 9, is used to effect tipping of housing 9. Rod 66 is shown in its retracted position in solid-lines and it assumes this position when housing 9 rests on a surface 69. However, when housing 9 is lifted, rod 66 will pivot by gravity to a vertical dotted-line position. When the housing 9 is moved in the direction of arrow 70, the vertical rod 66 will abut the side of container 47 and its movement in a counterclockwise direction will be prevented by lug 71 extending outwardly from the side of housing 9. Therefore, as housing 9 continues to move in the direction of arrow 70, it will tip in a counterclockwise direction about the axis of shaft 30. As the fork lift is moved in the direction of arrow 72 after dumping, and after rod 66 loses contact with container 47, housing 9 will assume a relatively horizontal position wherein lug 46 rests on fork 33. Thereafter housing 9 is conveyed by the fork lift to the location at which it is to be deposited and the forks 33 are lowered until the lower surface 73 of rod 66 touches the ground. Thereafter, the fork lift truck is backed off in the direction of arrow 72 so as to cause rod 66 to pivot from its dotted-line extended position to its solid-line retracted position, and this pivoting occurs until the housing 9 rests on the ground.

In FIGS. 11-14 a further modified embodiment of the present invention is disclosed. A dump bin 75 is shown having a floor 76, a pair of side walls 77, a rear wall 79, and an open front opposite the rear wall. A pair of wheels 80 are provided along with a handle 81 mounted on ears 82'. Thus, dump bin 75 may be wheeled manually to any desired location. The bearings 82 are permanently mounted on shafts 83 and the bearings 82 are balanced to assume a generally horizontal position so that they may be engaged by the forks 33 of the lift truck 34. In this respect, the forks 33 are raised into contact with the undersurface 84 of the bearings 82 and are moved forwardly until they engage the downwardly projecting lip 85. Thereafter, the housing 78 may be lifted and the slidable rods 86 can slide downwardly in sleeves 87 to the solid-line position of FIG. 14 so that housing 78 may be dumped into a container 47. Alternatively, if desired, the lower ends 89 of rods 86 may be caused to engage the upper surface 90 of a flat bed trailer or the like to cause tipping as described above relative to FIGS. 1-9. Stop lugs 91 are provided on opposite sides of housing 78 to engage the undersides of forks 33 to limit the amount to which housing 78 may be tipped during dumping. After dumping, the housing 78 will pivot to a relatively horizontal position and when it is set down onto the ground, slidable rods 86 will be pushed to a retracted position after engaging the ground as described in detail relative to the embodiment of FIGS. 1-9. Pins 92 are provided for insertion through aligned holes (not shown) in sides 77 and slidable rods 86 to maintain the in an elevated position in the event that they are not to be used.

A slidable rod 93 is located in sleeve 94 on rear wall 79. A plurality of holes 95, 96 and 97 are provided in rod 93. A pin 99 can be inserted through a hole in wall 79 and received in any one of holes 95, 96 or 97 to maintain rod 93 in a desired position. In this respect, if pin 99 locks rod 93 in the dotted line position shown in FIG. 11, the housing 78 will be tilted in the dotted-line position so that foreign material may be swept onto floor 76. It will be appreciated that even though rod 93 is locked in position, rods 86 will function in the slidable manner described above so that they may be used to provide engagement with container 47 to effect tipping of housing 78.

Figures 13, 14:
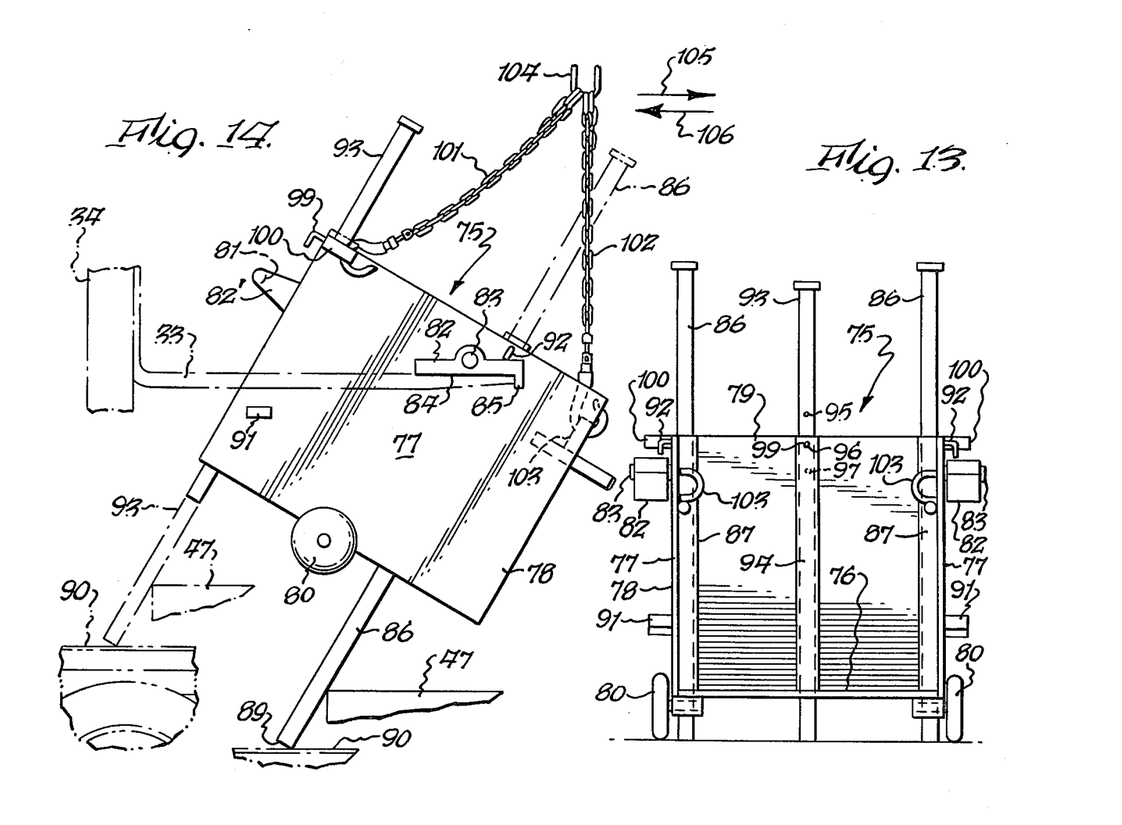
FIG. 13 is a rear view of the dump bin of FIG. 12.
FIG. 14 is a fragmentary view showing how the dump bin may be tipped in different positions by a fork lift or by the use of a chain hoist.

In certain circumstances it may be desired to use slidable rod 93 for abutting a container, such as 47 (FIG. 14), or for causing it to engage the upper surface of a flat bed, such as 90 (FIG. 14). In this case, pins 92 are used to lock slidable rods 86 in position and pin 99 is removed so as to permit rod 93 to slide in sleeve 94. In this case, because of the fact that the center of gravity of dump bin 75 is to the left of the axis of wheels 80, the cart will normally rest in a position wherein the corner at rear wall 79 and floor 76 rests on the ground. After housing 78 has been lifted, rod 93 will on the ground. After housing 78 has been lifted, rod 93 will slide to the dotted-line position shown in FIG. 14 so that it may be used as the stop to cause tipping of housing 78 as the fork lift is moved forwardly. It will be appreciated that after dumping has been completed and housing 78 has been moved away from container 47, housing 78 will pivot to a position wherein it is substantially horizontal and when the housing 78 is moved toward the ground, rod 93 will slide upwardly in sleeve 94 to permit the housing to be set onto the ground. When the housing 78 is transported by the fork lift, metal loops 100 will come to rest on forks 33 to limit the amount of counterclockwise movement of housing 78.

The embodiment of FIGS. 11-14 may be carried by a chain hoist, if desired, as well as by a fork lift. In this respect, a chain 101 may have its opposite ends attached to loops 100 and a chain 102 may have its opposite ends attached to loops 103 extending inwardly from side walls 77. Chains 101 and 102 are connected to ring 104 which in turn is connected to a hoisting device. When the chains are used to lift housing 78, it will assume a generally horizontal position, but rods 86 will slide downwardly. The two rods are required for abutting the side of container 47 or the top 90 of the flat bed so as to prevent pivoting of housing 78 about a vertical axis during dumping. After rods 86 engage container 47 or flat bed top 90, movement of ring 104 in the direction of arrow 105 will cause housing 78 to tip so as to discharge its contents. When ring 104 is moved in the direction of arrow 106, housing 78 will again assume a horizontal position after slidable rods 86 lose contact with the container 47. As the housing 78 is lowered toward the ground, the lowermost portions 89 of rods 86 will engage the ground first and as the housing 78 continues to be lowered, rods 86 will move from their extended positions to their retracted positions. If desired, single rod 93 may be used to effect tipping when the chain hoist is used because rod 93 is located at the rearmost portion of the housing 78. Housing 78 will therefore not pivot about a vertical axis during dumping after the extended rod 93 engages the side of the container 47 and ring 104 is moved in the direction of arrow 105.

In FIGS. 15-18 another embodiment of the invention is disclosed. In this embodiment dump bin 110 includes a housing 111 which is mounted on a pallet 112 for easy lifting by forks 33 of lift truck 34. Pallet 112 includes a base plate 113 from which a projection 114 extends downwardly On either side of projection 114 is an opening 115 for receiving the forks 33. Base 113 includes U-shaped receptacles 116 adjacent openings 115 for receiving forks 33. Portions 117, which form a part of base 113, receive pins 119 which are also received in lugs 120 affixed to the floor 121 of housing 111. Side walls 123 and 124 and end wall 125 extend upwardly from floor 121, and the side opposite end wall 125 is open. By the use of the foregoing arrangement, forks 33 may be received in spaces 115 and between U-shaped members 116 of the pallet so that the housing 111 may be transported by the fork lift. Mounted on side wall 124 are a pair of sleeves 126 and 127 which slidably receive rods 129 and 130, respectively. The rods and sleeves function in the same manner as described above relative to the preceding embodiments. Holes (not numbered) are provided in rods 129 and 130 for receiving pins 131 and 132, respectively, to selectively maintain the rods in a retracted position. If it is desired to use rod 129 for dumping, pin 131 is removed so that rod 129 can slide downwardly to its extended position. If it is desired to use rod 130 for dumping, pin 132 is removed.

Figure 15:
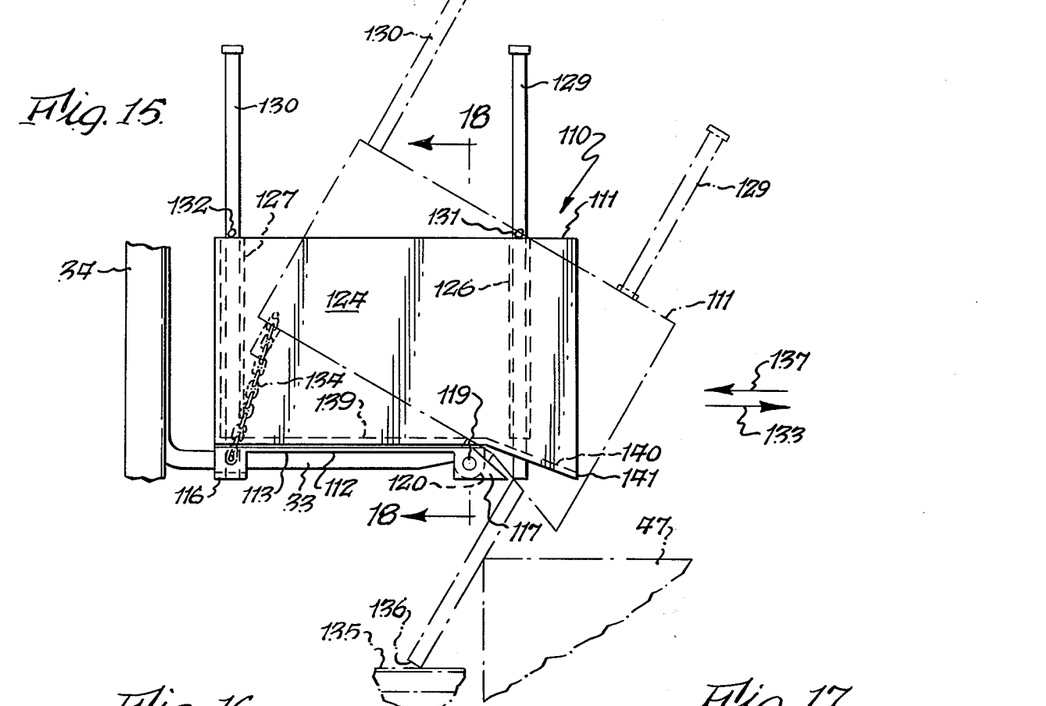
FIG. 15 is a fragmentary side elevational view of a further modified form of the dump bin pivotally mounted on a pallet for lifting by a fork lift and showing the dump bin in both the carrying and a plurality of dumping positions.
Figure 16:
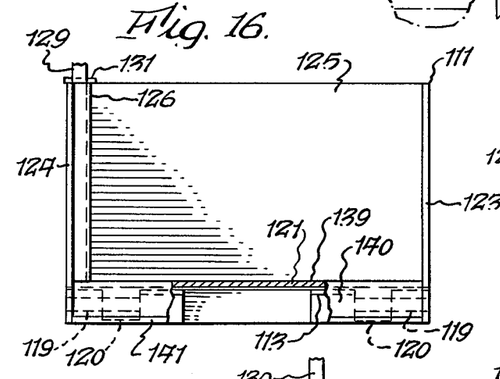
FIG. 16 is a front elevational view, partially broken away, of the dump bin of FIG. 15.
Figure 17:
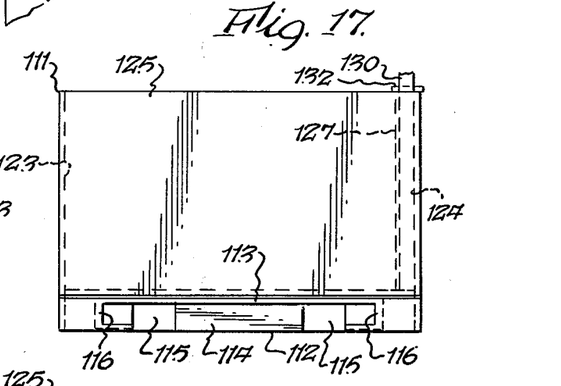
FIG. 17 is a fragmentary rear elevational view of the dump bin of FIG. 15.
Figure 18:
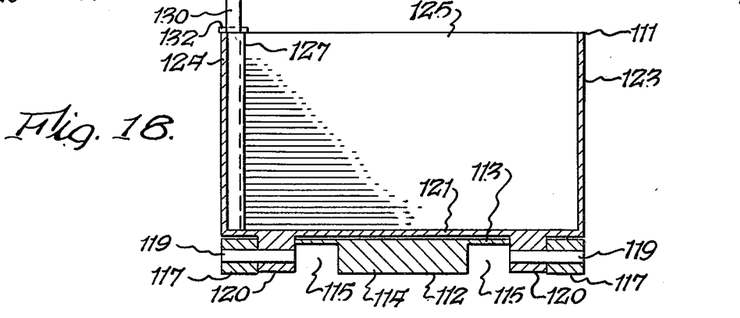
FIG. 18 is a fragmentary cross sectional view taken substantially along line 18—18 of FIG. 15.
Figures 19, 21:
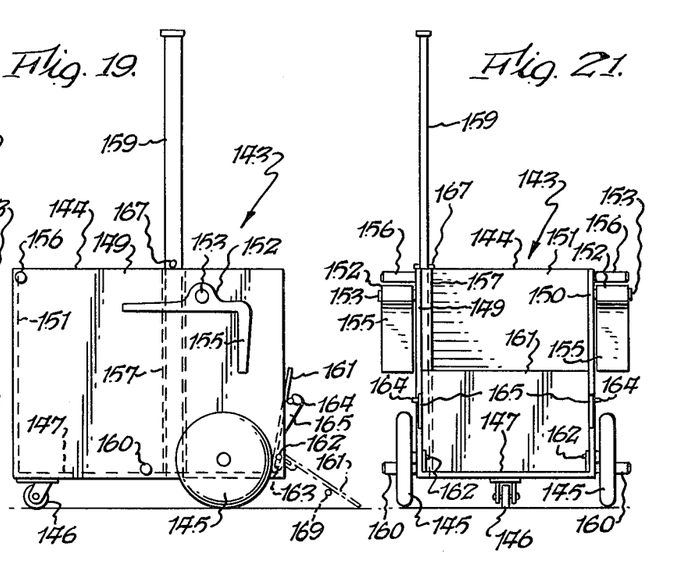
FIG. 19 is a side elevational view of a three-wheeled dump bin incorporating the principles of the present invention and having a front door.
FIG. 21 is a front elevational view of the dump bin of FIG. 19.
Figure 20:
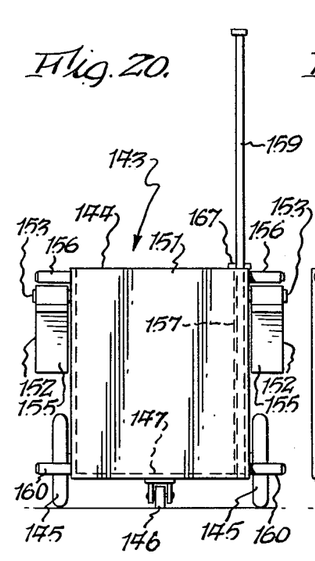
FIG. 20 is a rear elevational view of the dump bin of FIG. 19.

When dumping is to be effected, the dump bin 110 is lifted, and if pin 131 has been removed, rod 129 will slide downwardly and the fork lift will be moved in the direction of arrow 133 until rod 129 abuts the side of container 47, and continued movement will cause housing 111 to pivot about pins 119 to the dotted line position shown in FIG. 15. A chain 134 has its opposite ends attached between the pallet and housing 111 to limit clockwise pivotal movement of housing 111. In the event it is desired to dump on a flat bed 135, the lowermost end 136 of rod 129 in its extended position is brought downwardly on the flat bed and movement of the fork lift in the direction of arrow 133 will cause tipping of housing 111 to its dotted-line position. After dumping has been completed into either container 47 or onto the flat bed, movement of the fork lift in the direction of arrow 137 will cause housing 111 to return to its solid-line position, and as the housing is set down, rod 129 will be caused to move to its retracted position.

In the event it is desired to dump further into a container 47 than can be achieved with rod 129, the latter is held in its retracted position by the use of pin 131, but rod 130 is permitted to slide by removing pin 132, whereby the abutting of container 47 by the extended rod 130 will cause dumping to be further into the container, as described above in detail relative to FIGS. 6 and 7. It is to be noted that floor 121 consists of a horizontal section 139 and a forwardly inclined section 140. Thus, when the container is sitting squarely in a horizontal position on its attached pallet 113, the forward edge 141 of the floor is touching the surface on which pallet 113 rests, and thus material may be swept from such surface up onto floor 121 of housing 111.

In FIGS. 19-23 a still further embodiment of the present invention is disclosed. The dump bin 143 includes a housing 144 which is mounted on a pair of side wheels 145 and a rear swivel wheel 146 so that the dump bin can be moved by hand to any desired location. The housing 144 includes a floor 147, a pair of upstanding side walls 149 and 150 and a rear wall 151. A pair of bearings 152 are pivotally mounted on shafts 153 extending outwardly from the housing sides. Bearings 152 receive forks 33 of fork lift 34 in the manner shown in FIG. 22. The limit of movement of forks 33 to the right is determined by downwardly extending flanges 155 of bearings 152. After housing 144 has been lifted, lugs 156 will rest on forks 33. A sleeve 157 mounted on wall 149 slidably receives rod 159 which moves from the retracted position shown in FIGS. 19-21 to an extended position shown in FIGS. 22 and 23 after housing 144 is lifted. Rod 159 functions in the same manner as the analogous rods of the previous embodiments when dumping is effected into container 47. A pair of lugs 160 extend outwardly from the sides of the housing and they will abut the undersides of forks 33 to limit clockwise pivotal movement of housing 144 during dumping.

Figures 22, 23:
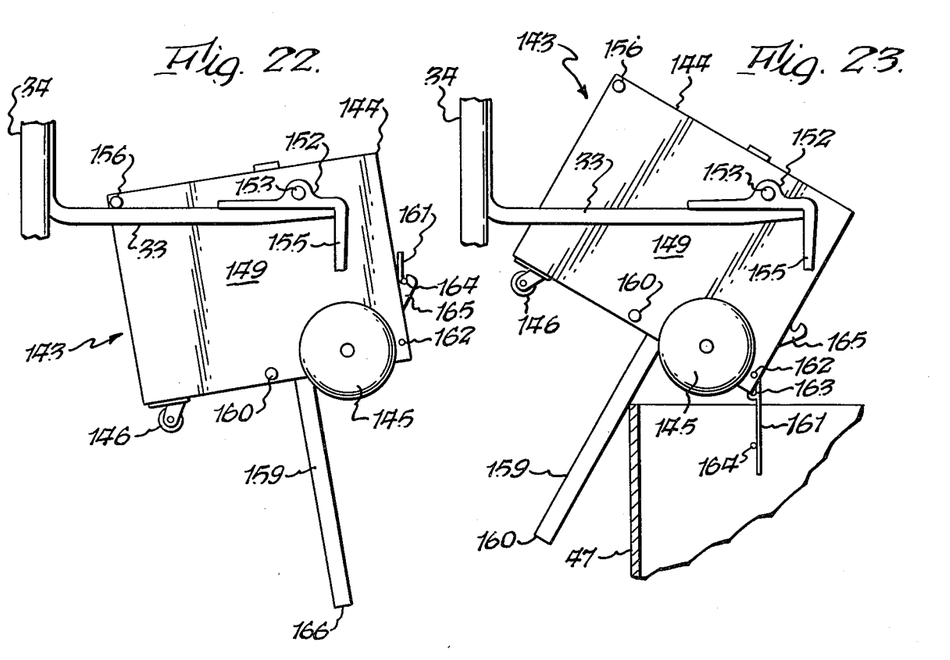
FIG. 22 is a fragmentary side elevational view showing the position of the dump bin of FIG. 19 when it is being transported by a fork lift.
FIG. 23 is a fragmentary side elevational view, partially in cross section, showing the position which the bin of FIG. 19 assumes during dumping.

A half door 161 has a pair of pins 162 mounted at its lower ends, and these pins slide in slots 163. Thus, door 161 can be moved to a closed position wherein pins 164 are received in associated slots in brackets 165. To open the door from the solid-line position shown in FIGS. 19 and 21 to move it to the dotted-line position of FIG. 19, the door is lifted and swung in a clockwise direction in FIG. 19. This will cause door 161 to function as a ramp so that waste material can be swept from the floor up onto door 161 and onto floor 147. The dump bin 143 can be carried by the fork lift with the door 161 open or closed but dumping should be effected with the door in the open position, as shown in FIG. 23. The door 161 should be closed in the event material is being carried which could otherwise spill out if the door were open.

After dumping has been effected, the fork lift is moved away from container 47 whereupon the housing 144 will pivot to the position shown in FIG. 22, and when the housing 144 is set down, rod 159 will move from the position shown in FIG. 22 to a retracted position wherein its bottom 166 rests on the floor, as would be the case if the retaining pin 167 has been removed. In this respect, the retaining pin 167 extends through an opening (not shown) in rod 159 to hold the latter in an elevated position so as to permit dump bin 143 to be wheeled as a cart. However, after bin 143 has been placed in its desired location and is stationary, pin 167 is removed so that rod 159 can drop downwardly until it engages the ground. Rods 156 double as handles by which the dump bin 143 can be wheeled.

It will be appreciated that the pivotal rod arrangement of FIG. 10 can be substituted for the slidable rod arrangements of all of the other embodiments. Furthermore, it will be appreciated that more than one pivotal rod can be used in each bin to give the effects depicted by FIGS. 6 and 7.

By way of general dimensions, the bins can be about eight feet long, about four and one-half feet wide, and about three and one-half feet high.

While preferred embodiments of the present invention have been disclosed, it will be appreciated that the present invention is not limited thereto but may be otherwise embodied within the scope of the following claims.

What is claimed is:

1. A dump bin comprising a housing including a floor and a plurality of sides extending upwardly from said floor, pivot means on said housing for permitting said housing to tip, bearing means for pivotally mounting said pivot means, means for receiving a device for lifting said bin, retractable-extensible means, and mounting means for mounting said retractable-extensible means relative to said housing for retaining said retractable-extensible means in a retracted higher position with respect to said floor when said bin is located on a supporting surface which engages a bottom portion of the bin and for permitting said retractable-extensible means to be moved by gravity to assume an extended position at a lower elevation with respect to said floor in response to lifting of said bin for dumping and for permitting movement of said retractable-extensible means to a retracted position aganst the force of gravity upon engagement of said retractable-extensible means with said supporting surface as said housing is being lowered, said retractable-extensible means in said extended position causing said housing to pivot about said pivot means as said bin is moved toward an external member after said retractable-extensible means has abutted said external member.

2. A dump bin as set forth in claim 1 wherein said retractable-extensible means comprises a rod, means pivotally mounting said rod on said housing, and means for limiting pivotal movement of said rod relative to said housing when said rod is in abutting engagement with said external member.

3. A dump bin as set forth in claim 1 wherein said retractable-extensible means comprises a rod, and means for mounting said rod on said housing for vertical sliding movement.

4. A dump bin as set forth in claim 3 wherein said means for mounting said rod on said housing comprises a sleeve mounted on one of said sides.

5. A dump bin as set forth in claim 1 wherein said bin includes a front portion from which material is dumped, and wherein said retractable-extensible means comprises a plurality of slidable rods, and means for mounting said slidable rods at different distances from said front portion.

6. A dump bin as set forth in claim 1 wherein said means for receiving a device for lifting said bin comprises members mountable on the forks of a fork lift, and wherein said pivot means comprises shaft means on said sides pivotable in said bearing means.

7. A dump bin as set forth in claim 6 wherein said bearing means are permanently affixed on said shaft means.

8. A dump bin as set forth in claim 1 wherein said means for receiving a device for lifting said bin comprises means on said sides for engagement by chain means which are used to lift said bin.

9. A dump bin as set forth in claim 8 wherein said retractable-extensible means comprises a pair of aligned rods mounted on opposite sides of said bin for substantially simultaneous engagement with said external member.

10. A dump bin as set forth in claim 1 wherein said bin has an open end, wheels on said bin, and means for maintaining the portion of said floor at said open end at the level of said supporting surface, whereby material may be swept into said bin at said open end.

11. A dump bin as set forth in claim 10 wherein said housing is mounted on a pallet, and wherein said means for maintaining the portion of said floor at said open end at the level of said supporting surface comprises a portion of said floor which is tilted downwardly.

12. A dump bin as set forth in claim 10 wherein said means for maintaining the portion of said floor at said open end at the level of said supporting surface comprises tilting means for tilting said bin so that the portion of the floor at said open end is at the level of said supporting surface.

13. A dump bin as set forth in claim 12 wherein said bin includes a rear wall opposite said open end, and wherein said tilting means comprises a rod, and means on said rear wall for slidably mounting said rod thereon for movement in a vertical direction.

14. A dump bin as set forth in claim 1 wherein said means for receiving a device for lifting said bin includes a pallet mounted under said floor for lifting by a fork lift, and wherein said pivot means comprise means pivotably mounting said housing on said pallet.

15. A dump bin as set forth in claim 1 including a plurality of wheels on said bin for maintaining said floor elevated above the level of said supporting surface, and a door pivotable about a horizontal axis on said housing for providing a ramp extending to the level of said supporting surface, whereby material may be swept into said bin from said supporting surface.

16. A dump bin as set forth in claim 1 wherein said pivot means are located to cause said housing to be so balanced that it returns to a material receiving attitude after the abutting relationship between said retractable-extensible means and said external member has terminated.

17. A dump bin comprising a housing including a floor and a plurality of sides extending upwardly from said floor, pivot means on said housing for permitting said housing to tip, bearing means for pivotally mounting said pivot means, means for receiving a device for lifting said bin, an elongated rod, means pivotally mounting said elongated rod on said housing for pivotal movement to a position wherein a portion of said elongated rod pivots to a predetermined lower elevation relative to said floor after said bin has been lifted by said device for lifting said bin than the elevation which said elongated rod occupies when said bin is resting on a supporting surface, and means on said housing for limiting pivotal movement of said elongated rod when said portion of said elongated rod has reached said predetermined lower elevation.

* * * * *